United States Patent [19]

Higuchi

[11] Patent Number: 4,466,751
[45] Date of Patent: Aug. 21, 1984

[54] COMBINED BEARING

[75] Inventor: Seiji Higuchi, Fujisawa, Japan

[73] Assignee: Nippin Seiko Kabushiki Kaisha, Tokyo, Japan

[21] Appl. No.: 449,516

[22] Filed: Dec. 13, 1982

[30] Foreign Application Priority Data

Dec. 25, 1981 [JP] Japan .................. 56-192791[U]

[51] Int. Cl.³ .................. F16C 21/00; F16C 19/34
[52] U.S. Cl. .................. 384/126; 308/219
[58] Field of Search ............ 308/219, 222, 226, 231, 308/234, 174; 384/126, 127, 128, 147

[56] References Cited

U.S. PATENT DOCUMENTS

| 3,934,956 | 1/1976 | Pitner | 308/219 X |
| 3,972,574 | 8/1976 | Pitner | 308/219 X |
| 4,120,542 | 10/1978 | Bhateja | 308/219 |
| 4,225,200 | 9/1980 | Dougall | 308/219 X |

FOREIGN PATENT DOCUMENTS

| 2346595 | 10/1977 | France | 308/219 |
| 1187290 | 4/1970 | United Kingdom | 308/219 |
| 1397965 | 6/1975 | United Kingdom | 308/2 R |

Primary Examiner—Stuart S. Levy
Assistant Examiner—Thomas R. Hannon
Attorney, Agent, or Firm—Wyatt, Gerber, Shoup, Scobey and Badie

[57] ABSTRACT

A combined bearing assembly comprises a thrust bearing receiving a thrust load with a number of rollers interposed between a planar inner member and a planar outer member, a radial bearing consisting of a radial receiving member secured to the inside diameter of a radial flange, the outer peripheral edge portion of the outer member having an outer flange formed by being axially bent, and a restraining member of L-shaped cross section fitted to the outer flange. The inside diameter dimension of the restraining portion of the restraining member is smaller than the outside diameter dimension of the inner member. The inner member and the outer member are prevented from being separated from each other.

8 Claims, 1 Drawing Figure

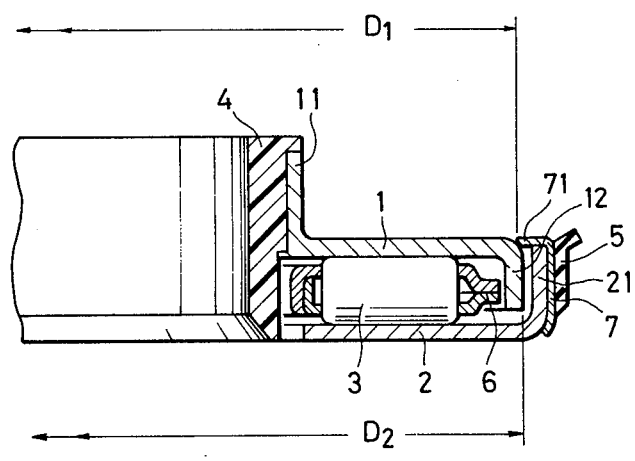

COMBINED BEARING

BACKGROUND OF THE INVENTION

1. Field of the Invention

This invention relates to a combined bearing assembly which comprises a composite of a thrust bearing and a radial bearing, and particularly to a combined bearing assembly which is effective for a strut type suspension.

2. Description of the Prior Art

Heretofore, a bearing for a strut type suspension has comprised a thrust bearing and a radial bearing installed independently of each other. This has led to the disadvantages that the space around the bearing is large and that the number of parts is great. As one structure which overcomes such disadvantages, there is a bearing of the type which comprises a composite of a thrust bearing and a radial bearing, but such bearing has been inconvenient to handle because the individual parts forming the bearing are separate from one another, or such bearing has had an inconvenience that the member sealing the bearing is mounted separately from the bearing.

SUMMARY OF THE INVENTION

It is an object of the present invention to overcome the above-noted disadvantages and to provide a combined bearing assembly whose parts are non-separate and made integral with one another and which is therefore simple to handle and light in weight.

The invention will become fully apparent from the following detailed description of an embodiment thereof taken in conjunction with the accompanying drawing.

BRIEF DESCRIPTION OF THE DRAWING

The FIGURE is a cross-sectional view of the combined bearing of the present invention.

DESCRIPTION OF THE PREFERRED EMBODIMENT

The combined bearing according to the embodiment shown in the drawing comprises an inner member 1 an outer member 2, rollers 3, a radial receiving member 4, for radial load, a seal member 5, a retainer 6 and a restraining member 7.

A number of rollers 3 are disposed in the axial clearance between the inner member 1 and the outer member 2 while being retained circumferentially by the retainer 6, thus forming a thrust bearing. The inner member 1 has a radial flange 11 extending axially from the inner peripheral edge portion thereof for receiving a radial load. The radial receiving member 4, formed of an elastic material such as plastic or rubber, is secured to the inside diameter of the radial flange 11 and is in contact with the outer periphery of a suspension member, not shown, thus forming a radial bearing which receives a radial load. The inner member 1 further has an inner flange 12 formed by axially bending the outer peripheral edge portion thereof. On the other hand, the outer member 2 has an outer flange 21 formed by axially bending the outer peripheral edge portion thereof. The inner flange 12 and the outer flange 21 overlap each other. The restraining member 7 of L-shaped cross section is fitted to the outside diameter of the outer flange 21, and has a restraining portion 71 engaging the inner flange 12. The inside diameter dimension $D_1$ of the restraining portion of the restraining member 7 is smaller than the outside diameter dimension $D_2$ of the inner flange 12. Further, the seal member 5 formed of an elastic material is secured to the restraining member 7, and the seal member 5 is in contact with or in proximity to the partner member of the suspension, not shown, thus sealing the bearing.

As described above, the combined bearing assembly of the present invention comprises a composite of a thrust bearing and a radial bearing and the inside diameter dimension of the restraining portion of the restraining member is smaller than the outside diameter dimension of the inner flange of the inner member, and the two members are engaged with each other and therefore, the members constituting the bearing are not separated from each other but are integral. Further, a seal member is mounted on the outside of the bearing while, on the other hand, a radial receiving member formed of an elastic material such as rubber and serving also as a seal is mounted on the inside of the bearing, and this eliminates the necessity of separately providing a sealing device. That is, the combined bearing of the present invention, including the seal member, is made unitary and therefore is compact and simple to handle as well as light in weight.

It is also possible to bend the outer flange inwardly and make it non-separable without providing the restraining member.

I claim:

1. A combined bearing assembly comprising:
   a thrust bearing adapted to receive a thrust load and including a number of rollers interposed between a planar inner member and a planar outer member;
   a radial bearing consisiting of a radial receiving member adapted to recieve a radial load and secured to the inside diameter portion of a radial flange of said inner member;
   the outer peripheral edge portion of said outer member having an outer flange formed by being axially bent; and
   means inculding a restraining member of L-shaped cross section fitted to said outer flange and having a restraining portion extending radially towards said inner member with the inside diameter dimension of the restraining portion of said restraining member being smaller than the outside diameter dimension of said inner member so that said restraining portion engages said inner member for preventing said inner member and said outer member from being separated from each other under radial load.

2. A combined bearing assembly according to claim 1, wherein the outer peripheral edge portion of said inner member has an inner flange formed by being axially bent, and said inner flange and said outer flange are fitted to each other.

3. A combined bearing assembly according to claim 1, further comprising a seal member secured to said restraining member.

4. A combined bearing assembly according to claim 1, wherein said radial receiving member is a unitary member having elasticity.

5. A combined bearing assembly for sustaining both the thrust and radial loads of an element rotating relative a partner member; said bearing assembly comprising:
   means including an inner member arranged circumferentially around said element, an outer member arranged circumferentially around said element and a plurality of rollers interposed therebetween for sustaining thrust load;

means including a flange extending axially from a radially inner portion of said inner member for receiving a radial load and a rigid restraining member fixed between the radially outer portion of said outer member and the partner member with a restraining portion of said restraining member abutting the radially outer portion of said inner member for sustaining radial load.

6. A combined bearing according to claim 5, the radially outer portion of said inner and outer members having flanges extending axially in opposite directions to overlap one another, said restraining member having an axially extending portion fixed to the outer surface of the flange of said outer member and said restraining portion extending radially inwards over the end portion of the flange of said outer member.

7. A combined bearing according to claim 6, including a seal member fixed between said axially extending portion of said restraining member and said partner member.

8. A combined bearing according to claim 5, including a member formed of an elastic material fixed to the radially inner surface of the flange extending axially from a radially inner portion of said inner member of said member for receiving radial load from said element.

* * * * *